(12) United States Patent
Ghosh et al.

(10) Patent No.: US 7,065,112 B2
(45) Date of Patent: Jun. 20, 2006

(54) WAVELENGTH LOCKER

(75) Inventors: Chuni Ghosh, West Windsor, NJ (US); Laurence S. Watkins, Pennington, NJ (US); Qing Wang, Plainsboro, NJ (US); Raymond William Simpson, Hamilton Square, NJ (US); Steven R Leffler, Lawrenceville, NJ (US)

(73) Assignee: Princeton Optronics, Inc., Mercerville, NJ (US)

( * ) Notice: Subject to any disclaimer, the term of this patent is extended or adjusted under 35 U.S.C. 154(b) by 268 days.

(21) Appl. No.: 10/435,197

(22) Filed: May 12, 2003

(65) Prior Publication Data

US 2004/0228375 A1 Nov. 18, 2004

(51) Int. Cl.
*H01S 3/13* (2006.01)
*H01S 3/10* (2006.01)

(52) U.S. Cl. .......................................... 372/32; 372/20

(58) Field of Classification Search ................... 372/18, 372/20, 29.02, 32
See application file for complete search history.

(56) References Cited

U.S. PATENT DOCUMENTS

| | | | |
|---|---|---|---|
| 4,172,663 A | 10/1979 | Byer et al. | |
| 4,536,089 A | 8/1985 | Siebert | |
| 4,748,632 A | 5/1988 | Preston | |
| 4,822,998 A | 4/1989 | Yokota et al. | |
| 5,046,184 A | 9/1991 | Chee et al. | |
| 5,151,585 A | 9/1992 | Siebert | |
| 5,173,907 A | 12/1992 | Benda et al. | |
| 5,362,681 A | 11/1994 | Roberts, Jr. et al. | |
| 5,568,318 A | 10/1996 | Leger et al. | |
| 5,623,510 A | 4/1997 | Hamilton et al. | |
| 5,914,804 A | 6/1999 | Goossen | |
| 5,949,801 A | 9/1999 | Tayebati | |
| 6,016,199 A | 1/2000 | Newton | |
| 6,041,071 A | 3/2000 | Tayebati | |
| 6,108,355 A | 8/2000 | Zorabedian | |
| 6,282,213 B1 | 8/2001 | Gutin et al. | |
| 6,295,308 B1 | 9/2001 | Zah | |
| 6,323,987 B1* | 11/2001 | Rinaudo et al. | 359/589 |
| 6,345,238 B1* | 2/2002 | Goodwin | 702/130 |
| 6,853,654 B1* | 2/2005 | McDonald et al. | 372/20 |
| 6,931,038 B1* | 8/2005 | Mazed | 372/32 |
| 2003/0035120 A1* | 2/2003 | Myatt et al. | 356/519 |
| 2003/0173505 A1* | 9/2003 | Wipiejewski | 250/226 |
| 2003/0227949 A1* | 12/2003 | Meyers | 372/32 |

OTHER PUBLICATIONS

P. Laporta, S. De Silvestri, V. Magni, O. Svelto, "Diode-pumped cw bulk Er:Yb:glass laser," Optics Letters, Optical Society of America, vol. 16 ( No. 24), p. 1952-1954, ( Dec. 15, 1991).

(Continued)

*Primary Examiner*—James Menefee
(74) *Attorney, Agent, or Firm*—Venable LLP; Henry J. Daley

(57) ABSTRACT

A wavelength locker comprising a semiconductor or air gap etalon is used to monitor and maintain the output wavelength of a coherent radiation source. Said etalon may be fabricated from a commercially available silicon wafer, with individual regions of the wafer, each functioning as a separate etalon, etched or otherwise processed to produce different thicknesses. Illumination by the coherent radiation source generated transmitted signal intensities that are detected and processed to determine the output wavelength of the coherent radiation source. A wavelength tuner is then used to maintain or vary the output wavelength based on continuous measurements of etalon signal intensity.

1 Claim, 8 Drawing Sheets

OTHER PUBLICATIONS

S. Taccheo, P. Laporta, S. Longhi, C. Svelto, "Experimental analysis ans theoretical modeling of a diode-pumped Er:Yb:glass microchip laser," Optics Letters, Optical Society of America, vol. 20 ( No. 8), p. 889-891, ( Apr. 15, 1995).

S. Taccheo, P. Laporta, S. Longhi, O. Svelto, C. Svelto, "Diode-pumped bulk erbium-ytterbium lasers," Appl. Phys. B, 63, p. 425-436, (1996).

S. Jiang, S. Hamlin, J. Myers, D. Rhonehouse, M. Myers, J. Lucas, "High Average Power 1.54 um Er3+:Yb3+-doped Phosphate Glass Laser," submitted to CLEO'96.

S. Taccheo, P. Laporta, O. Svelto, "Linearly polarized, single-frequency, widely tunable Er:Yb bulk laser at around 1550 nm wavelength," Appl. Phys. Lett., American Institute of Physics, vol. 69 ( No. 21), p. 3128-3130, ( Nov. 18, 1996).

S. Taccheo, P. Laporta, C. Svelto, "Widely tunable single-frequency erbium-ytterbium phosphate glass laser," Appl. Phys. Lett, American Institute of Physics, vol. 68 ( No. 19), p. 2621-2623, ( May 6, 1996).

C. Svelto, E. Bava, "Frequency stbility measurements of 1.5 um erbium lasers locked to acetylene absorption lines," CPEM'98, Washington (Jul. 6-10, 1998).

S. Taccheo, P. Laporta, O. Svelto, G. De Geronimo, "Theoretical and experimental analysis of intensity noise in a codoped erbium-ytterbium glass laser," Appl. Phys. B, Springer-Verlag, 66, p. 19-26, (1998).

P. Laporta, S. Taccheo, S. Longhi, O. Svelto, C. Svelto, "Erbium-ytterbium microlasers: optical properties and lasing characteristics," Optical Materials, Elsevier Science B.V., 11, p. 269-288, (1999).

E. Tanguy, C. Larat, J.P. Pocholle, "Modeling of the erbium-ytterbium laser," Faculte des Sciences et des Techniques de Nantes, Groupe de Physique due Solide pour l'electronique (Nantes, France).

R. Francini, F. Giovenale, U.M. Grassano, P. Laporta, S. Taccheo, "Spectroscopy of Er and Er-Yb-doped phosphate glasses," Optical Materials, Elsevier Science B.V., 13, p. 417-425, (2000).

E. Tanguy, G. Feugnet, J.P. Pocholle, R. Blondeau, M.A. Poisson, J.P. Duchemin, "High energy erbium laser end-pumped by a laser diode bar array coupled to a Nonimaging Optic Concentrator," Optics Communications, Elsevier Science B.V., 145, p. 105-108, (1998).

T.Y. Fan, "Aperture guiding in quasi-three-level laser," Optics Letters, Optical Society of America, vol. 19 ( No. 8), p. 554-556, (Apr. 15, 1994).

M. Brunel, F. Bretenaker, A. Le Floch, E. Molva, "Two-tunable-frequency microlasers passively Q-switched by Cr4+:YAG," CLEO'99, Friday Morning, CFD5—9:00 am, (May 28, 1999).

R. Haring, R. Paschotta, E. Gini, H. Melchior, U. Keller, "Sub-nanosecond pulses from passively Q-switched microchip laser at 1.53 um," CLEO'99, Friday Morning, CFD6—9:15 am, (May 28, 1999).

S. Taccheo, G. Sorbello, S. Longhi, P. Laporta, "210 mW single-frequency diode-pumped Er:Yb:glass laser at 1.5 um," CLEO'99, Friday Morning, CFD7—9:30 am, (May 28, 1999).

A.J. Kemp, R.S. Conroy, T.K. Lake, G.J. Friel, B.D. Sinclair, "Guiding effects in microchip lasers at pump powers well above threshold," CLEO'99, Friday Morning, CFD8—9:45 am, (May 28, 1999).

S. Jiang, J. Myers, D. Rhonehouse, M. Myers, R. Belford, S. Hamlin, "Laser and thermal performance of a new erbium doped phosphate laser glass," SPIE, vol. 2138 (1994).

Siao-Lung Hwong, Wang-Lin Tsai, Tsong-Shin Lim, Jyh-Long Chern, "Influences of Pump-Beam Focusing Conditions on a Laser-Diode Pumped Microchip Nd:YVO4 Laser," Jpn. J. App. Phys., Publication Board, Japanese Journal of Applied Physics, p. L1330-L1332, vol. 38 (Nov. 15, 1999).

A-F. Obaton, J. Bernard, C. Parent, G. Le Flem, J.M. Fernandez-Navarro, J-L. Adam, M.J. Myers, G. Boulon, "New Laser Materials for Eye-Safe Sources: Yb3+-Er3+-Codoped Phosphate Glasses," OSA Advance Solid-State Laser (ASSL) Proceedings, 1999.

* cited by examiner

WAVELENGTH LOCKER

BACKGROUND OF THE INVENTION

1. Field of the Invention

The present invention is related to devices used to monitor and control coherent radiation sources. More specifically, it relates to devices that measure and maintain output wavelengths of coherent radiation sources.

2. Description of Related Art

The use of wavelength tunable coherent radiation sources generally requires that the output wavelength of said source be both stable and accurate during extended periods of operation. Current tunable sources, which use tuning methods including MEMS technology to vary the mechanical dimensions of a laser cavity, or variation of the source temperature, may not have the required long-term stability. A means for continuously monitoring and controlling the output wavelength of the source during operation is then required.

The use of Fabry-Perot etalons in the detection and analysis of coherent radiation is well known in the art. One example is the patent to Byer et al. (U.S. Pat. No. 4,172,663), in which a plurality of etalons are constructed with pairs of half-silvered mirrors. The gap between etalon mirrors is filled with a gas which may be adjusted in pressure to correct the optical properties of the etalon. Illumination from a coherent source is directed sequentially through a series of etalons of increasing resolution, producing interference patterns that are sequentially directed onto a spatial detector. The radii of the first and second rings of the respective interference patterns are measured to derive fractional fringe order measurements of successively higher resolution, so that the source wavelength is determined in successively increasing steps of higher resolution.

In another example, the patent by Siebert (U.S. Pat. No. 4,536,089) describes a plurality of etalons of varying thicknesses to detect and determine the wavelength of incident coherent radiation in an environment where incoherent radiation is also present. The etalons utilized in this case are fabricated by deposition of reflective coatings on either side of a glass plate of varying thickness. The source wavelength is determined by comparison of transmitted signal intensities at each etalon thickness.

In a third example, the patent to Yokota (U.S. Pat. No. 4,822,998) comprises a plurality of etalons fabricated by processing a silicon dioxide layer, which is deposited onto a glass substrate, to have a series of stepped thicknesses. A reflective coating is disposed on either side of the silicon dioxide layer. Determination of a coherent source wavelength is made in the same manner as the example given immediately above.

As exemplified by the given examples, existing technology requires precision fabrication techniques, are relatively bulky, and have high manufacturing expense. A need then exists for an improved device to monitor and maintain the wavelength of a coherent radiation source.

SUMMARY OF THE INVENTION

An object of the present invention is to create an improved device, for monitoring and maintaining the output wavelength of a coherent radiation source, for example, one which is less expensive, easier to fabricate and mass produce, and/or more compact than the existing technology.

The present invention comprises a semiconductor etalon. In one embodiment, a polished silicon wafer is etched or otherwise processed to provide a plurality of regions of different thicknesses, each region functioning as an individual etalon for a portion of the output radiation from a wavelength-tunable coherent radiation source. The regions are configured to have a square pattern of four contiguous squares in one embodiment, with each of the plurality of regions being processed such that their thicknesses differ in steps of one eighth of a wavelength (in silicon), for a wavelength that is preferably near the middle of the range of wavelengths to be measured. Each of the regions may be further processed to alter or enhance the etalon response, including processing to produce a sub-region of different thickness in order to generate a more sinusoidal etalon response as a function of wavelength, and application of a smoothing solution to etched etalon surfaces in order to generate increased signal intensity.

Illumination from a coherent source is incident on each of the regions functioning as an etalon. An array of radiation detectors, at least one for each of the regions, is disposed directly behind a side of the semiconductor etalon opposite to the side that is illuminated. In one embodiment, each of said radiation detectors is a photodiode. Each of said radiation detectors measures the signal intensity of radiation transmitted through the region behind which it is disposed.

Each of said measured signal intensities are communicated to a signal processor, which makes a determination of the wavelength of the radiation source based on collective measured signal intensities as a function of wavelength. In one embodiment of the invention, thicknesses of said plurality of regions are processed such that they differ in steps of one eighth of a wavelength (in silicon), for a wavelength that is preferably near the middle of the range of wavelengths to be measured, resulting in pairs of measured etalon signal intensities which are in quadrature, thus avoiding wavelength ranges with simultaneously undetectable wavelength dependencies of etalon signal intensity for all regions.

Said signal processor is in communication with a wavelength tuner, which is connected to, and capable of changing the output wavelength of, said coherent radiation source. Said signal processor commands said wavelength tuner to maintain or vary the output wavelength of said coherent radiation source based on the most recent sampling of etalon signal intensities from said radiation detectors. In one embodiment, said coherent radiation source is a tunable laser, wherein the output wavelength of said source is varied using MEMS technology to change the mechanical dimensions of the laser cavity. In another embodiment, the wavelength tuner varies the temperature of said coherent radiation source to change the output wavelength.

The present invention may be fabricated in a compact size, using commercially available silicon wafers, with standard semiconductor processing techniques suitable for mass production, resulting in significant manufacturing cost reductions over present technology.

In another embodiment of this invention, a wavelength locker for a coherent radiation source has an air-gap etalon that has a plurality of resonance regions, and a plurality of radiation detectors, each disposed proximate a respective one of the plurality of resonance regions, a signal processing unit in communication with the plurality of radiation detectors, and a wavelength tuner in communication with the signal processing unit. The air-gap etalon has first and second semiconductor etalon faces with air gap reserved therebetween.

BRIEF DESCRIPTION OF THE DRAWINGS

These and other objects and advantages of the invention will become more apparent and more readily appreciated from the following detailed description of the presently preferred exemplary embodiments of the invention, taken in conjunction with the accompanying drawings, of which.

DETAILED DESCRIPTION OF THE INVENTION

In the following description, for purposes of explanation and not limitation, specific details are set forth such as particular optical and electrical circuits, circuit components, techniques, etc. in order to facilitate a thorough understanding of the present invention. However, the invention may be practiced in other embodiments that depart from these specific details.

Figure 1B:
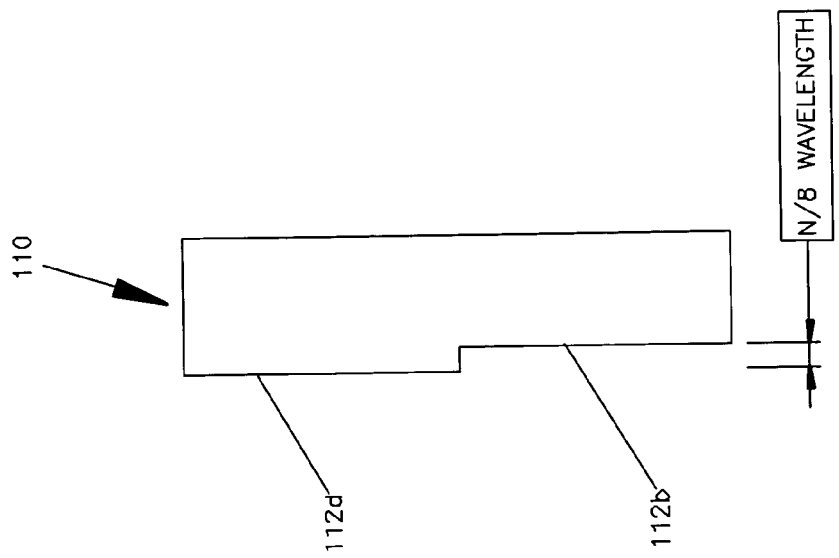
FIGS. 1A and 1B are schematic illustrations of a semiconductor etalon according to one embodiment of the present invention.
Figure 1A:
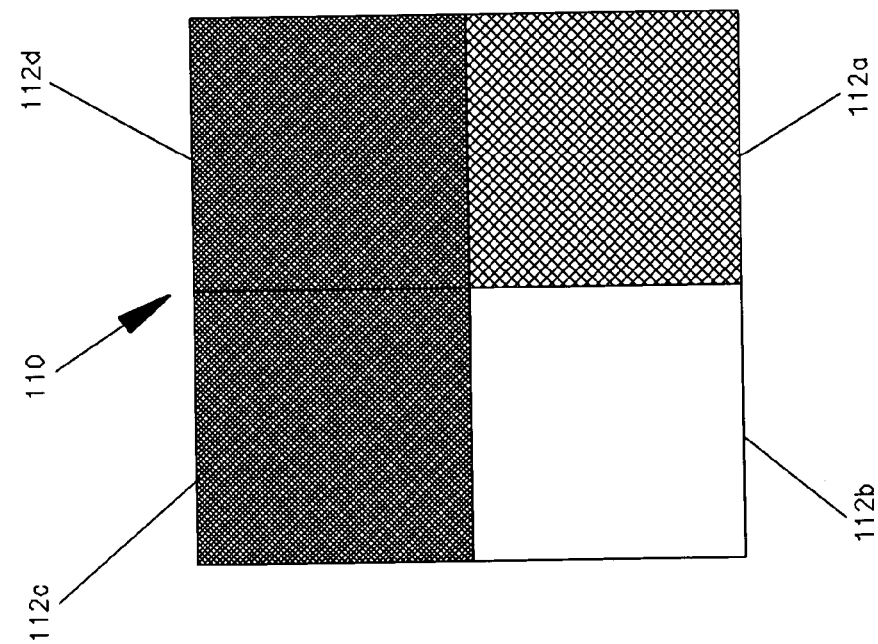

FIGS. 1A (plan view) and 1B (side view) illustrate a semiconductor etalon 110 according to an embodiment of the present invention. A semiconductor plate, or portion thereof, is etched or otherwise processed to provide semiconductor etalon 110 having a plurality of resonance regions 112a, 112b, 112c and 112d with different thicknesses. Each of said plurality of resonance regions 112a–112d has an arbitrarily shaped cross sectional area which is substantially parallel to either face of the semiconductor plate. In the embodiment illustrated in FIG. 1A, the plurality of resonance regions 112a–112d comprise a square pattern of four contiguous squares, but the semiconductor etalon 110 according to the present invention is not in any way constrained to only the number and/or geometrical arrangement of the plurality of areas 112a–112d shown.

In one embodiment of the present invention, having the geometry illustrated in FIGS. 1A and 1B, each of said plurality of resonance regions 112a–112d is processed so as to have thicknesses which differ in steps of one eighth of a wavelength (in the semiconductor), for a wavelength that is preferably near the middle of the range of wavelengths to be measured. In this embodiment, the thickest of the plurality of resonance regions 112a–112d is diagonally opposed to the thinnest of said resonance regions, but said plurality of resonance regions 112a–112d may be arbitrarily arranged according to thickness.

One method of fabricating a semiconductor etalon, according to the present invention, comprises chemically etching a semiconductor plate along a first strip, followed by chemically etching said semiconductor plate along a second strip which partially overlaps said first strip, producing regions of different thickness.

The plurality of resonance regions 112a–112d which differ in thickness by an integral number of eighth wavelengths offers an advantage of providing optical signals from one or more pairs of resonance regions, in quadrature. This guarantees a substantial wavelength dependence of transmitted etalon signal intensity, at any wavelength within the desired measurable wavelength range, for at least one of said plurality of resonance regions 112a–112d. There is, therefore, no wavelength within the desired measurable wavelength range at which the change in intensity of a detected optical error signal as a function of wavelength is simultaneously undetectably small for all of said plurality of resonance regions 112a–112d being utilized as etalons. This allows for an accurate measurement of wavelength at all wavelengths within a designated wavelength range of interest.

Use of a semiconductor material in fabrication of the present invention allows the use of well-developed processing methods that are efficient and inexpensive. In an exemplary embodiment of the invention a commercially available polished silicon wafer is used as the semiconductor plate 110, allowing the use of ordinary silicon processing techniques which have a small cost per unit and are easily adaptable to mass production. The properties of commercially available silicon wafers for the semiconductor plate 110 are fortuitously advantageous for functioning as an etalon. A significant portion of illumination incident on each of said plurality of resonance regions 112a–112d is reflected at both air-silicon interfaces due to the large index of refraction of silicon. Additionally, polished wafer surfaces, which enhance the wafer reflectivity, are available at no extra cost, as silicon wafers used in the fabrication of microcircuits are normally polished. Finally, silicon wafers with a 500 micron thickness are readily available commercially. This provides a periodic response from the silicon etalon that is approximately one cycle per nanometer change in wavelength. Device sensitivity increases with wafer thickness, due to a smaller wavelength span between cycles, but this results in a smaller wavelength range over which the output wavelength of the coherent radiation source cannot become locked on a wavelength other than desired due to the periodic response of the etalons as a function of wavelength. A 500 micron wafer thickness provides an optimal compromise for wavelengths currently of interest in optical communications systems.

Other materials that are suitable for semiconductor devices, GaAs, for example, may be used as an alternative to silicon without departing from the scope of this invention.

In one embodiment of the invention, a smoothing solution may be applied to processed surfaces of each of the plurality of resonance regions 112a–112d. In tests run with a prototype of the invention the etalon signal intensity was significantly increased from resonance regions to which the smoothing solution was applied.

Figure 2:
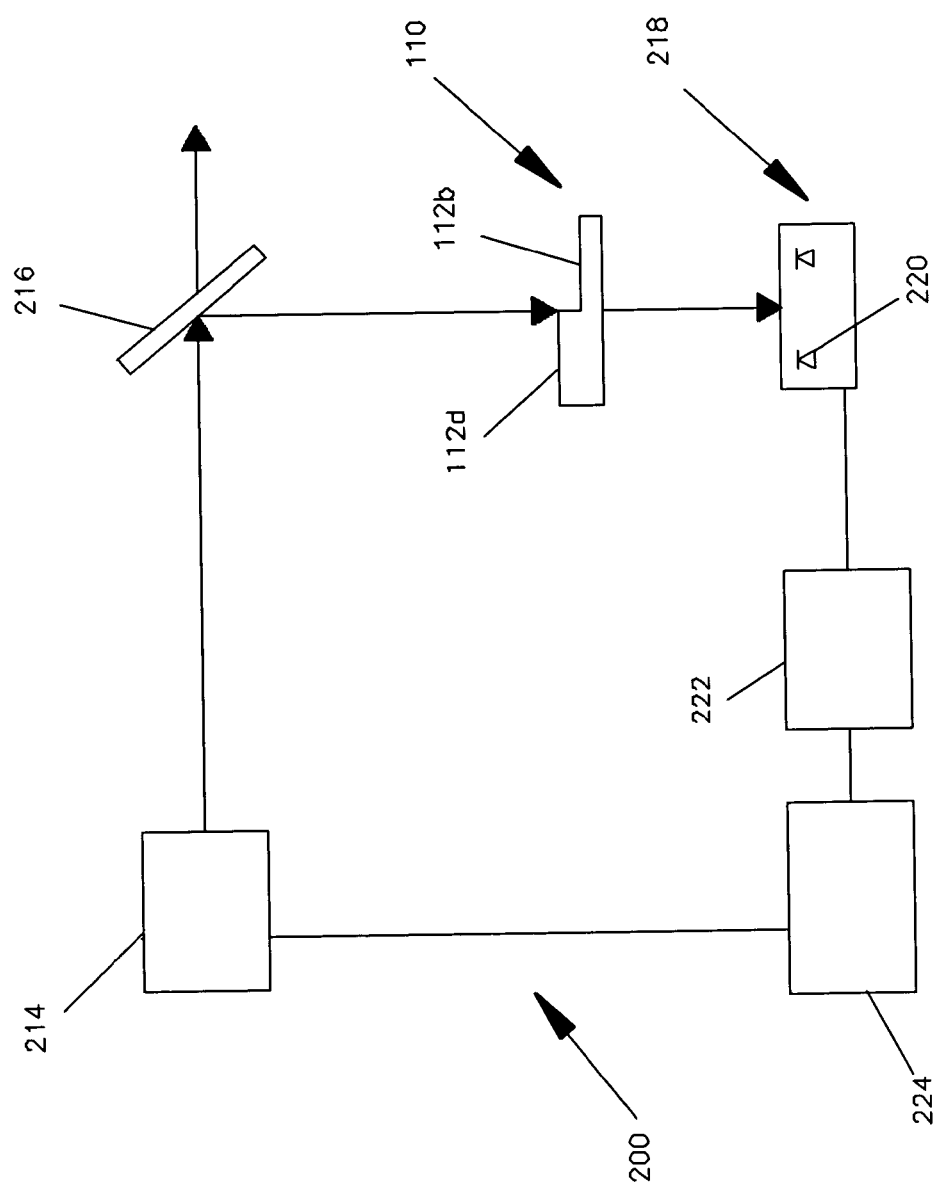
FIG. 2 illustrates an embodiment of the present invention as incorporated as part of a system to monitor and maintain the output wavelength of a coherent radiation source.

FIG. 2 illustrates an embodiment of an optical source monitor and control system 200 according to the present invention for monitoring and maintaining the output wavelength of a coherent radiation source 214. In one embodiment, the coherent radiation source 214 is a laser. A beam splitter 216 is employed to divert a portion of the laser beam to be incident on the semiconductor etalon 110. One face of the semiconductor etalon 110, including said plurality of resonance regions 112a–112d, is oriented to receive a portion of the illumination from said coherent radiation source 214. Each of said plurality of resonance regions 112a–112d functions as an etalon for illumination received from the coherent radiation source 214. Although the diverted illumination must be incident on said semiconductor etalon 110 nearly perpendicularly, the angular tolerance for the silicon etalon is greater than for glass, air or vacuum etalons of equivalent resolution.

Radiation detector 218 is disposed directly behind a face of the semiconductor etalon 110, which is opposite to the semiconductor plate face illuminated by the coherent radiation source 214. The radiation detector 218 is comprised of at least one radiation detection element 220 placed directly behind one of the plurality of resonance regions 112a–112d, disposed in such a manner as to detect the intensity of light transmitted through the resonance region behind which the discrete radiation detection element 220 is disposed. A signal processing unit 222 is connected to, and in communication with, each of the radiation detector elements 220.

A wavelength tuning unit 224 is in communication with, and responsive to commands from, the signal processing unit 222.

The wavelength tuning unit 224 is further connected to, and has the ability to vary the output wavelength of, the coherent radiation source 214.

Figure 4:
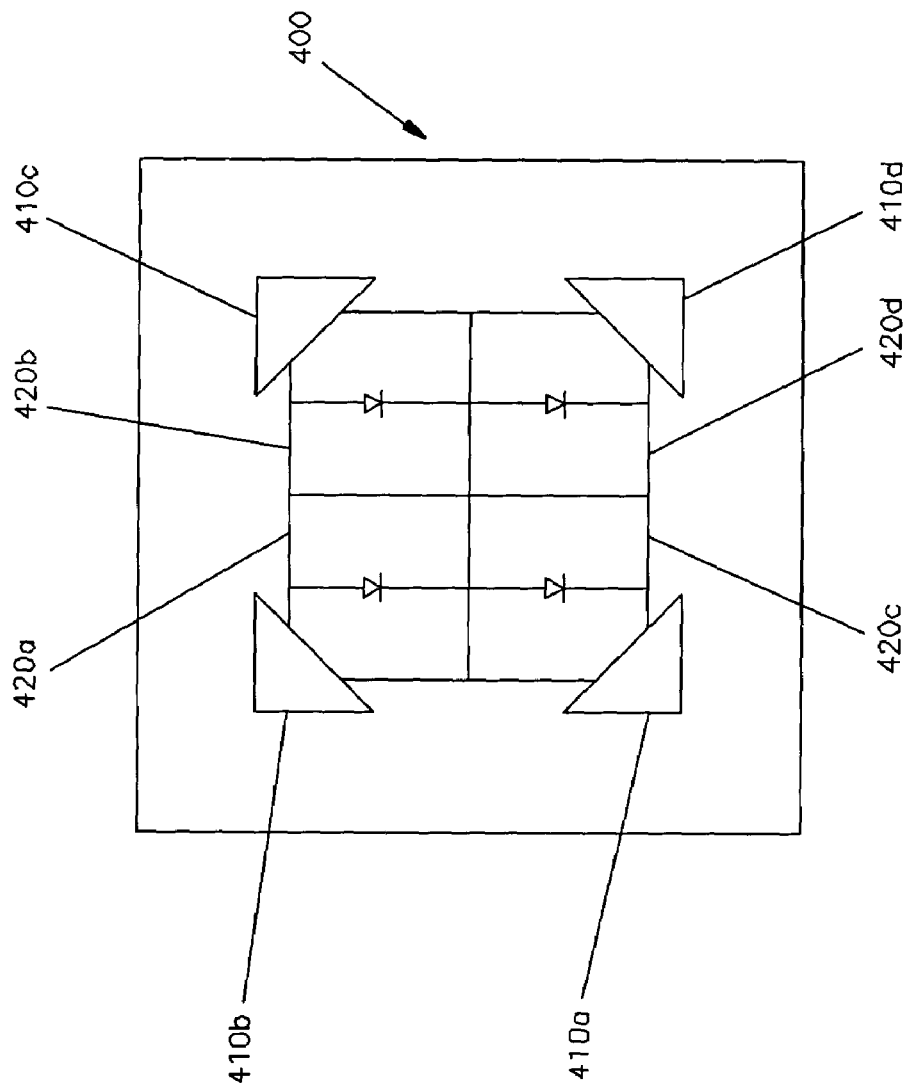
FIG. 4 illustrates the use of etched corner supports to hold in place photodiodes used as radiation detection elements for a semiconductor etalon.

In one embodiment of the invention, each discrete radiation detection element 220 is a photodiode, with the photodiodes connected to the signal processing unit 222 with analog-to-digital conversion circuitry. In a prototype of the present invention, each photodiode is a discrete element mounted on a circuit board disposed behind the semiconductor etalon 110. In another embodiment, providing a more compact arrangement, the photodiodes are attached to a semiconductor chip that is held in place with etched corner supports formed on the semiconductor etalon 110. This is illustrated in FIG. 4, with etched corner supports 410a–d holding photodiodes 420a–d, respectively, in place.

Alternatively, the semiconductor etalon 110 and the semiconductor chip to which the photodiodes are attached can be secured together with a fabricated metal frame. In yet another embodiment, photodiodes may be fabricated by depositing semiconductor layers, e.g., silicon or germanium, directly onto the semiconductor etalon 110.

In one embodiment of the present invention, said wavelength tuning unit 224 can control the output wavelength by variation of the temperature of the coherent radiation source 214. In another embodiment, the output wavelength can be altered using MEMS technology or piezoelectric actuators to vary the mechanical dimensions of the coherent radiation source 214. These examples of having mechanisms to tune the output wavelength are representative structures. The invention is not limited to only those tuning mechanisms.

Given the known thickness of each of the plurality of resonance regions 112a–112d, behind each of which a particular radiation detector element 218 is disposed, the signal processing unit 222 samples at periodic intervals the illumination intensity received by each of the radiation detector elements 218, and calculates the wavelength of radiation transmitted through each of the plurality of resonance regions 112a–12d based on the measured illumination intensity. Alternatively, the locker may be calibrated after assembly, and the calibration results stored within the signal processing unit, thus removing the need for the signal processing unit to perform calculations based on thickness. In addition, this method removes the need to know or control the thickness precisely in manufacture.

Dependent on the results of the most recent wavelength calculations, the signal processing unit 222 communicates with the wavelength tuning unit 224, commanding the wavelength tuning unit 224 to correct or maintain the output wavelength of the coherent radiation source 214.

In operation of the present invention, it is desirable to normalize the signal intensity measured by each of the radiation detector elements 218 relative to the total output power of the coherent radiation source 214. This is done in order to separate out changes in detected signal intensities due to output power fluctuations of the coherent radiation source 214 from changes due to variation of the output wavelength. One method used is the direct measurement of the output power. In one embodiment, a portion of the beam from the coherent radiation source 214 is diverted directly onto a photodiode. Signal intensity measurements from the photodiode are provided to the signal processing unit 222, allowing normalization of measured signal intensities from throughout each of the plurality of resonance regions 112a–112d.

Alternative embodiments utilize methods which do not require the direct monitoring of the intensity of the output beam from the coherent radiation source 214. One method is to calculate the total power output of the coherent radiation source 214 as a number proportional to the sums of the squares of the individual signal intensities of all said radiation detector elements 218, then normalize the measured signal intensity of said plurality of resonance regions 112a–112d relative to the calculated power level. Especially for this embodiment of the present invention, it is helpful to fabricate sub-regions of each of said plurality of resonance regions 112a–112d that have a slightly different thickness than the remainder of the region. This provides for a more sinusoidal etalon response as a function of wavelength.

In yet another embodiment, said signal processing unit 222 may be configured to determine the need for tuning of the output wavelength based on calculation of ratios of detected signal intensities from pairs of illuminated resonance regions 112a–112d.

Figure 3:
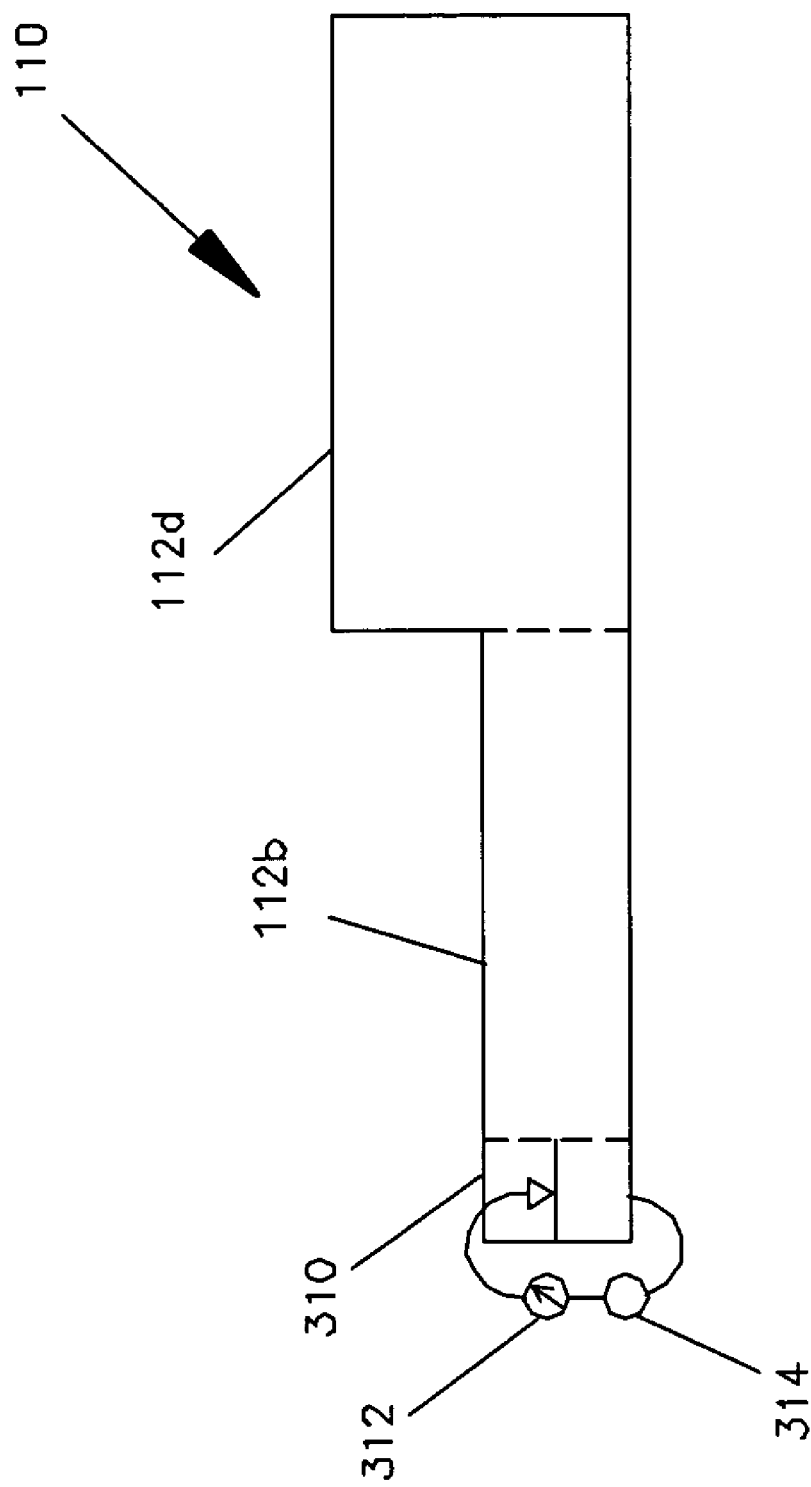
FIG. 3 schematically illustrates the use of a diode, integrated with a semiconductor etalon, to monitor the temperature of the semiconductor etalon.

The response of the semiconductor etalon is significantly temperature dependent. It is, therefore, desirable to monitor the etalon with a temperature sensor. In one embodiment, a diode is integrated into the semiconductor etalon 110. This is schematically illustrated in FIG. 3. The diode 310 is maintained in a forward biased state during etalon operation. The temperature of the semiconductor etalon 110 is monitored by observation of the voltage, using the voltage meter 314, across the diode 310, while applying a constant current with a current source 312. Using the known temperature variation of diode voltage with temperature, temperature fluctuations of the semiconductor etalon 110 are detected. This information may be used to either control the temperature of the semiconductor plate or to normalize detected signal intensities. Other embodiments can use any known method of temperature sensing.

It is also possible to optically alter the geometry of the output beam from said coherent radiation source 214 before incidence on said semiconductor etalon. Possible alterations in alternative embodiments include collimation and expansion of the beam diameter using optical lenses. These beam alterations enable reductions in size and cost of the present invention. It is also possible to divide the output beam into a plurality of beams using beamsplitters or other optical components, such that each of the resonance regions receives its own separate beam. This beam alteration may improve the accuracy and stability of the invention.

A calibration procedure is performed for the semiconductor etalon prior to initial operation. This may be accomplished with an external test station that monitors and measures the signal intensity from each radiation detector element 218 while incrementally varying the output wavelength of the coherent radiation source 214. Using such data, it is not necessary that system components be held to a strict initial accuracy, but only that they provide long term stability. Additionally, the calibration process allows determination of the wavelength dependence of the signal intensity from each of said plurality of resonance regions 112a–112d. This in turn allows preferential selection at any given wavelength of the signals from the resonance regions with substantial wavelength dependence of the signal intensity at that wavelength, allowing for more accurate control of the output wavelength.

Figure 5:
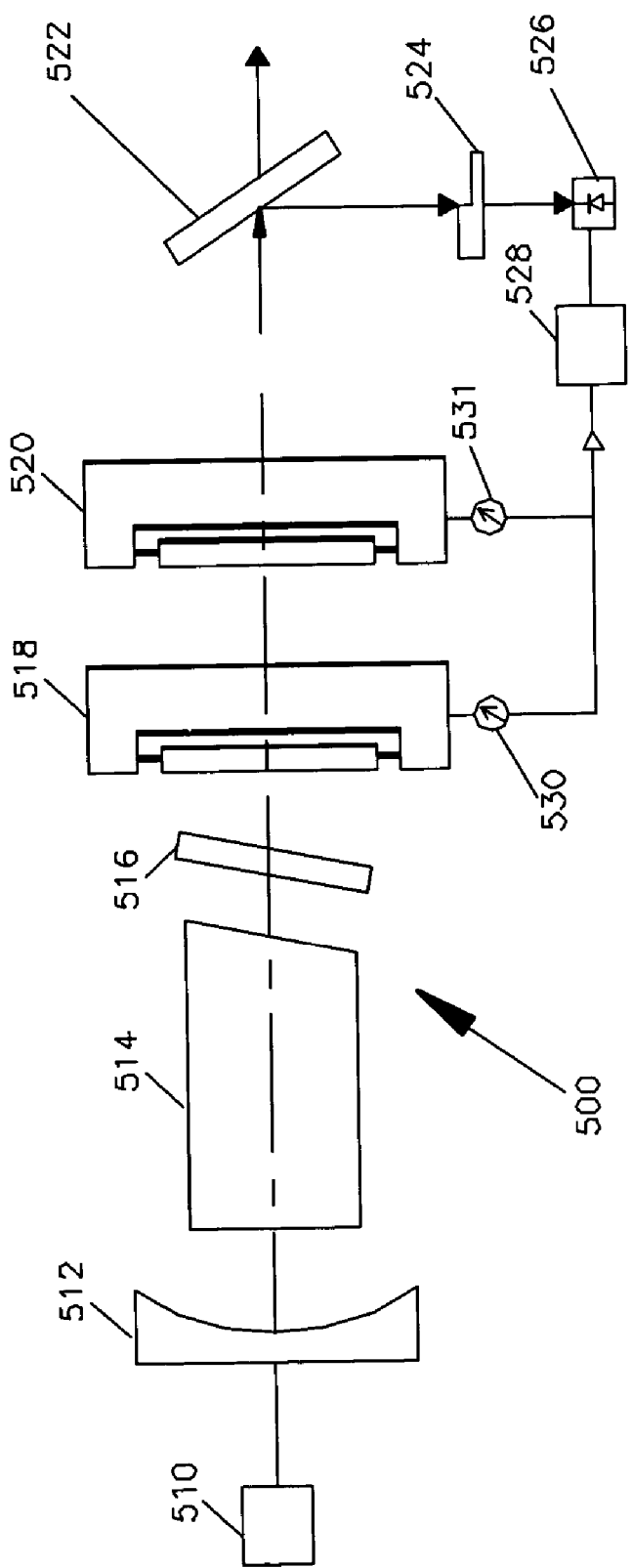
FIG. 5 schematically illustrates a diode pumped solid state laser into which a semiconductor etalon according to an embodiment of the current invention is incorporated for use as a wavelength locker.

The present invention can be used both to select a single longitudinal mode of a tunable laser, and to vary the wavelength of that mode. FIG. 5 schematically illustrates a diode pumped solid state laser 500 into which a semiconductor etalon according to an embodiment of the current invention is incorporated for use as a wavelength locker. The laser 500 is comprised of, proceeding from left to right in FIG. 5, a pump source 510, reflective mirror 512, gain medium 514, filter 516, tunable filter 518, output coupler 520, beam splitter 522, semiconductor etalon 524, radiation detector 526, signal processor 528, and wavelength tuning units 530 and 531. The ends of the laser cavity are defined by the reflective mirror 512 and output coupler 520. The filter 516 serves to block radiation originating directly from the pump source. The output coupler 520 is comprised of an electromechanical device (typically MEMS or piezoelectric) that functions as a movable mirror wherein the laser cavity length may be varied by changing an applied voltage, thus changing the output wavelength of the laser. The output coupler 520 is connected directly to the wavelength tuning unit 531.

A portion of the output radiation from the laser 500 is diverted to illuminate the semiconductor etalon 524. Based on the signal intensities observed being transmitted through the various resonance regions 112a–112d of the semiconductor etalon 524, the signal processor 528 determines the output wavelength of the laser; and the wavelength tuning unit 530, based on commands from the signal processor 528, varies or maintains the voltage applied to the tunable output coupler 520, thus varying or maintaining the output wavelength of the laser. As can be seen in FIG. 5, the tunable filter 518 is connected directly to the wavelength tuning unit 530. In a similar manner as the output coupler 520 is controlled by the wavelength locker, the peak transmission wavelength of the tunable filter 518 may be varied using an applied voltage determined by the wavelength locker, thus varying or maintaining the longitudinal mode in which the laser is operating.

Figure 6:
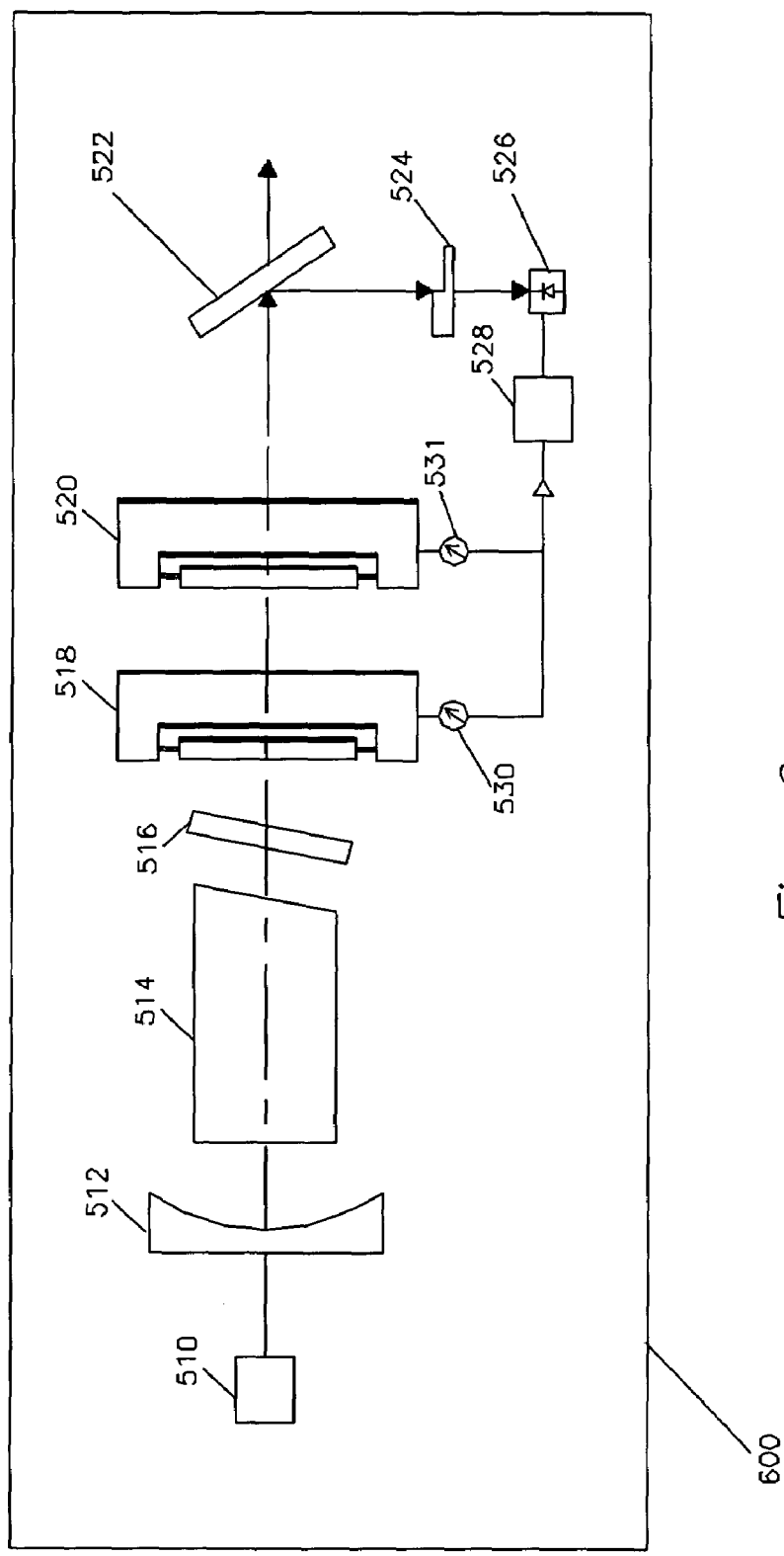
FIG. 6 is a schematic illustration of a tunable laser and a wavelength locker, according to an embodiment of the present invention, mounted on a common substrate.

In a preferred embodiment of the present invention, when used to select the longitudinal mode or vary the wavelength of a tunable laser, all system components may be mounted on a common substrate. This is schematically illustrated in FIG. 6, with all labeled components being mounted on the substrate 600. This offers the advantage of a more compact arrangement of components and makes it easier to maintain all system components at a common temperature.

Figure 7:
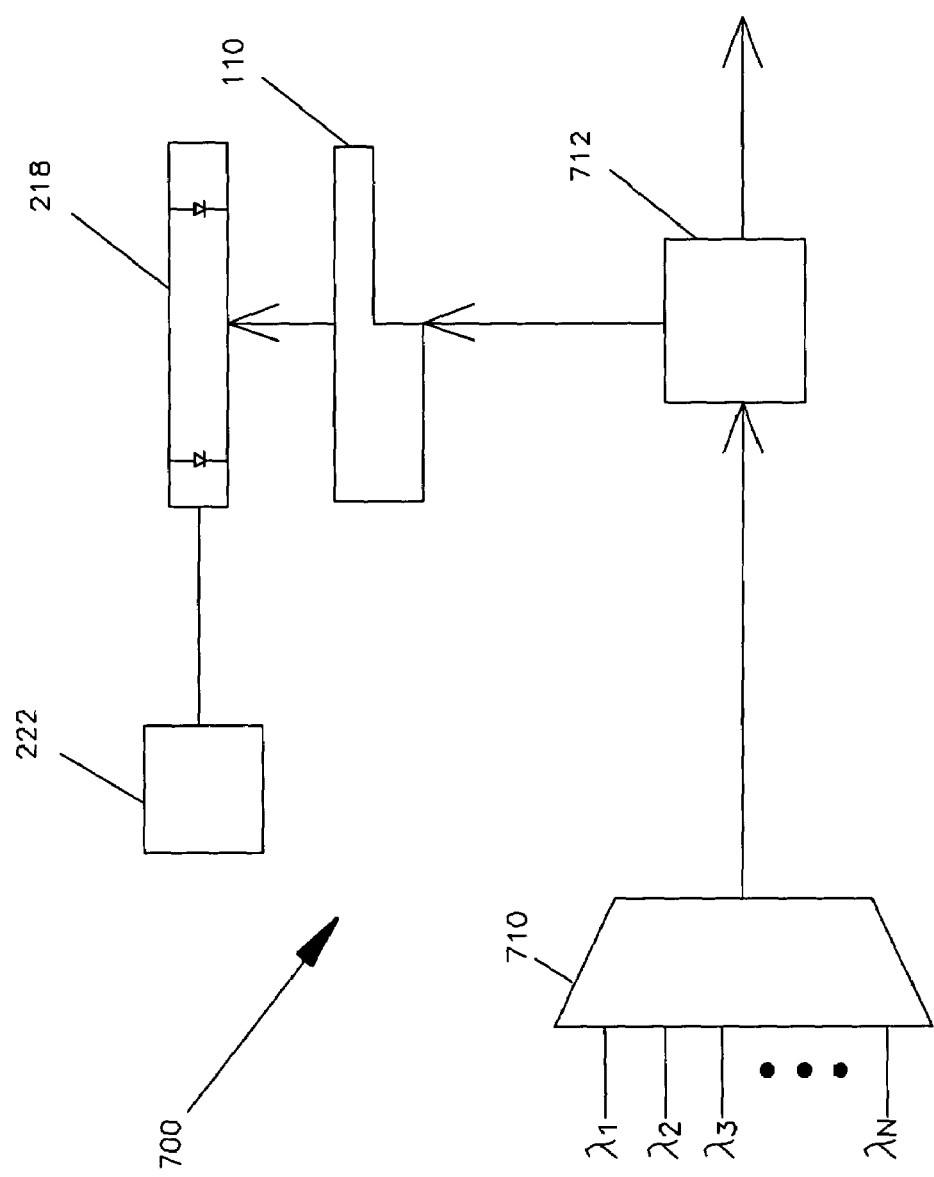
FIG. 7 is a schematic illustration of a wavelength locker, according to an embodiment of the present invention, incorporated into a DWDM system to function as an optical channel monitor.

The present invention may also be used as a channel monitor, for example, in a DWDM communications system, to monitor the wavelength of an optical source or to maintain it at any designated wavelength; or it could be used to measure signal intensities to provide feedback for a tunable optical filter in a DWDM system. FIG. 7 is a schematic illustration of the present invention as incorporated into a DWDM system 700 as a channel monitor. A tunable filter 712 diverts a portion of the incoming optical signal, at a designated wavelength, to illuminate the semiconductor etalon 110. Etalon signal intensities are then detected by the radiation detector 218, with said signal intensities being processed by the signal processing unit 222.

Figure 8:
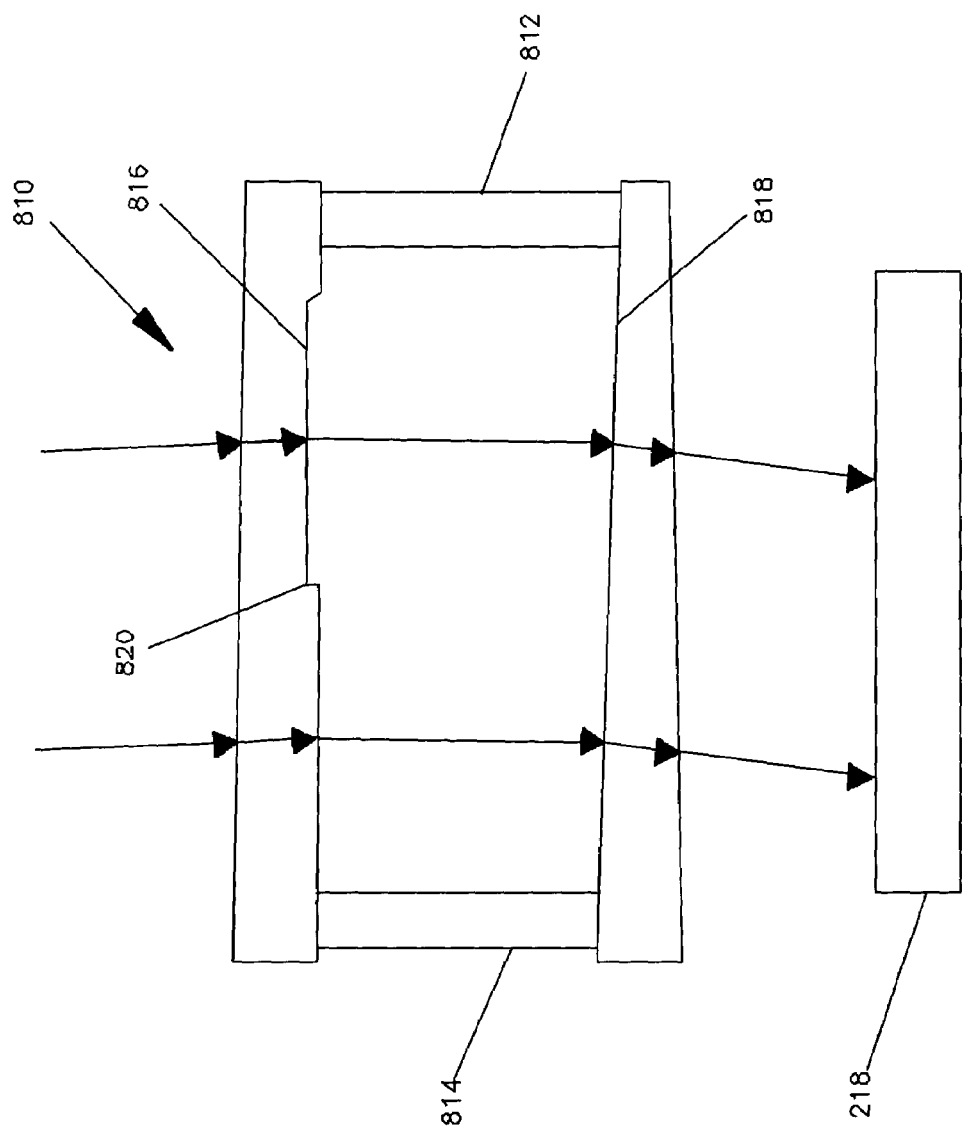
FIG. 8 is a schematic illustration of an air-gap etalon according to an embodiment of this invention that may be incorporated in any of the wavelength locker, laser or optical communication system of this invention.

In another embodiment of the current invention, semiconductor etalon 110 is replaced with an air-gap etalon 810, as illustrated in FIG. 8. This air-gap etalon has improved temperature measurement and control behavior compared to other etalons.

The air-gap etalon 810 has ultra-low thermal expansion glass spacers 812 and 814. The air-gap etalon 810 also has etalon faces 816 and 818. A suitable material for the etalon faces 816 and 818 is silicon. One or both of etalon faces 816 and 818 may be etched in a manner similar to that of the etalon 110. This produces several resonance regions whose air gaps differ in thickness by the amount of the etchback. The depth of the etchback is different in this embodiment. In this example, a sub-facet dither is not used, which results in the etalon throughput being non-sinusoidal as a function of wavelength. The optimum etchback is that for which the change in transmission with wavelength is greatest for wavelengths where that change is smallest for one of the other resonance regions. (i.e. one attempts to make the worst case as good as possible). Computer examination of the Fabry-Perot response showed that the best etchback for our configuration in this example was about 114 degrees rather than 90 degrees (quadrature). This corresponds to a variation in thickness between the resonance regions of about 0.158 times a wavelength preferentially chosen to be near the middle of the band of wavelengths to be measured.

Another problem of many prior-art implementations is that the responses are periodic with respect to wavelength or frequency. This would require an approximate tuning method based on other information or merely the repeatability of the tuning actuating method. Often the repeatability is not sufficient. In this embodiment of the invention, the addition of a resonance region with a gap slightly less than the gap of the other two resonance regions provides improved results. The response of this third etalon then has a different period from that of the other two etalons. Then at any wavelength, by examining the outputs of the three etalons (normalized to the laser power), the wavelength can be deduced unambiguously. A four quadrant photodiode, with three of the quadrants sensing the light after passing through respective ones of the three etalons is suitable. The fourth quadrant may be used to sense a fraction of the laser light without it passing through an etalon as an indication of laser output power. This can then be used for normalization of the etalon responses and to control the laser output power. Etalon nominal spacings of 700 microns, 700.245 microns, and 672 microns have been found to be suitable, but the invention is not limited to such specific spacings. The 700 and 700.245 micron spacings are formed by using 700 micron spacers on each end of a pair of silicon bars from a silicon wafer. The 0.245 micron difference is formed by etching the silicon. Since the etchback is easily controlled to a practicable tolerance (in our case the tolerance was looser than +/−10% of the 0.245 microns) by known techniques of silicon etching, the need to fabricate highly precise spacers can be eliminated. The 700 micron spacers can be somewhat in error, as long as they are of substantially equal length. Substantially equal length spacers may be achieved by cutting both spacers from the same piece of glass. In addition, the silicon is wedged (tapered) so that although the silicon surfaces forming the etalon are highly parallel, the other silicon surfaces are not. This prevents the formation of parasitic etalons which otherwise would degrade the locker performance. The other silicon surfaces may also be coated with an antireflective coating.

FIG. 8 shows two beams passing through such an etalon 810. The etch step 820 is also shown schematically.

The laser output beam such as is illustrated in FIG. 2 is sampled by a beam splitter, which is an appropriately coated plate of glass mounted at an angle (45 degrees in our case), which provides 2 sample beams plus the main laser output (which exits parallel to the input beam and slightly offset from it). A second, appropriately coated, glass plate splits each of these beams into two additional beams, for a total of four sample beams (plus the main output).

Considerable attention to detail is required to get the locker to work well. Stray light is a problem and a combination of design details and absorbent coatings at strategic points in the locker were found to provide good performance. Ray tracing was used to determine probable stray light paths and to arrange surfaces to reflect the stray light away from the sensors as much as possible. Even with such measures, there can remain some undesired effects which distort the response of the system, relative to the calculated values. These problems were overcome by the calibration process. Precise agreement with calculated response based on the etalon thickness is not required. However, the distortion should remain constant. The processing unit then is able to control frequency by reference to its calibration table.

The invention is described above with reference to exemplary embodiments. The current invention is not limited to only the above examples, but covers the entire inventive concepts as defined by the claims, as follows.

We claim:

1. A wavelength locker for a coherent radiation source, comprising:
    a semiconductor etalon having a plurality of resonance regions;
    a plurality of radiation detectors, each disposed proximate a respective one of said plurality of resonance regions;
    a signal processing unit in communication with said plurality of radiation detectors; and
    a wavelength tuner in communication with said signal processing unit;
    wherein said semiconductor etalon is a monolithic piece of semiconductor material,
    wherein said plurality of radiation detectors are an array of photodiodes, and
    wherein said array of photodiodes are disposed on a semiconductor chip which is fixed to said semiconductor etalon, said semiconductor etalon having etched corner supports.

* * * * *